United States Patent

Takagi

[11] Patent Number: 5,596,387
[45] Date of Patent: Jan. 21, 1997

[54] AUTO-EXPOSURE DEVICE OF A CAMERA

[75] Inventor: Tadao Takagi, Yokohama, Japan

[73] Assignee: Nikon Corporation, Tokyo, Japan

[21] Appl. No.: 352,419

[22] Filed: Dec. 7, 1994

Related U.S. Application Data

[63] Continuation of Ser. No. 272,999, Jul. 14, 1994, abandoned, which is a continuation of Ser. No. 65,262, May 21, 1993, abandoned.

[30] Foreign Application Priority Data

Jun. 9, 1992 [JP] Japan .................................. 4-174892

[51] Int. Cl.⁶ .................................................. G03B 7/08
[52] U.S. Cl. ........................... 396/50; 396/225; 396/234
[58] Field of Search ................................. 354/412, 430, 354/432, 413, 127.1, 406; 358/29

[56] References Cited

U.S. PATENT DOCUMENTS

| | | | |
|---|---|---|---|
| 4,364,650 | 12/1982 | Terashita et al. | 354/432 |
| 4,566,775 | 1/1986 | Tsunekawa | 354/432 |
| 4,918,519 | 4/1990 | Suzuki et al. | 358/29 |
| 4,982,219 | 1/1991 | Uchiyama | 354/406 |
| 5,001,552 | 3/1991 | Okino | 358/29 |
| 5,016,039 | 5/1991 | Sosa et al. | 354/430 |
| 5,065,232 | 11/1991 | Kondo | 358/29 |
| 5,220,375 | 6/1993 | Ishida et al. | 354/430 X |
| 5,227,836 | 7/1993 | Yasukawa et al. | 354/415 |
| 5,258,805 | 11/1993 | Aoki et al. | 354/289.12 X |
| 5,266,983 | 11/1993 | Takagi | 354/412 |

FOREIGN PATENT DOCUMENTS 1-280732  11/1989  Japan .

*Primary Examiner*—Russell E. Adams

[57] ABSTRACT

An auto-exposure device of a camera which can generate a photograph which fits to an image of a photographing time band in the photographing of an evening scene, a morning scene and so on. The auto-exposure device comprises a split photo-metering device for photo-metering a plurality of split areas of an object field, a color temperature measurement device for measuring a color temperature of a light source for illuminating the object field, and an exposure calculation device for calculating an exposure value based on the output of the split photo-metering device and the output of the color temperature measurement device.

25 Claims, 9 Drawing Sheets

AUTO-EXPOSURE DEVICE OF A CAMERA

This is a continuation of application Ser. No. 08/272,999 filed Jul. 14, 1994, which is a continuation of application Ser. No. 08/065,262 filed May 21, 1993, both now abandoned.

BACKGROUND OF THE INVENTION

1. Field of the Invention

The present invention relates to an autoexposure device of a camera which uses color temperature information.

2. Related Background Art

A device which measures color temperature information of a light source at the time of photographing, calculates print correction information based on the color temperature information, and records it for making correction at the time of printing has been known (Japanese Laid-Open Patent Application No. 1-280732).

In the above prior art device, however, when a film used is a negative film, a desired correction may be made at the time of printing by using the color temperature information, but when the film is a reversal film, it is not possible to correct after the photographing.

SUMMARY OF THE INVENTION

It is an object of the present invention to provide an auto-exposure device of a camera which can generate a photograph which fits to an image of a photographing time band in the photographing of an evening scene or a morning scene.

In order to achieve the above object, one embodiment of the auto-exposure device of the camera of the present invention comprises:

split photo-metering means (11, 21) for photo-metering a plurality of split areas of an object field;

color temperature measurement means (11, 22) for measuring a color temperature of a light source for illuminating the object field; and exposure calculation means (23) for calculating an exposure value based on the output of said split photo-metering means and the output of said color temperature measurement means.

In another embodiment of the present invention, said exposure calculation means (23) calculates (S7) a first exposure value based on the output of said split photo-metering means (11, 12) and corrects (S8) the first exposure value based on the output of said color temperature measurement means to calculate the exposure value.

In another embodiment of the present invention, said exposure calculation means (23) calculates the exposure value in such a manner that the output of said color temperature measurement means contributes when the color temperature is low (S102).

In other embodiment of the present invention, said exposure calculation means (23) calculates the exposure value in such a manner that the output of said color temperature measurement means contributes to increase the exposure value.

In another embodiment of the present invention, said exposure calculation means (23) calculates (S104) the exposure value by setting a high weight to a high output value of the output of said split photo-metering means. In another embodiment of the present invention, the auto-exposure device of the camera comprises:

split photo-metering means (11, 21) for photo-metering a plurality of split areas of an object field;

color temperature measurement means (11, 22) for measuring a color temperature of a light source for illuminating the object field;

attitude detection means (13) for detecting an attitude of the camera; and exposure calculation means (23) for calculating an exposure value based on the output of said split photo-metering means, the output of said color temperature measurement means and the output of said attitude detection means.

In other embodiment of the present invention, said exposure calculation means (23) calculates (S129) the exposure value in such a manner that the output of said photographing distance detection means and the output of said color temperature measurement means contribute when the photographing distance is long (S121) and the color temperature is low (S122).

In another embodiment of the present invention, the auto-exposure device of the camera comprises:

split photo-metering means (11, 21) for photo-metering a plurality of split areas of an object field;

color temperature measurement means (11, 22) for measuring a color temperature of a light source for illuminating the object field;

photographing distance detection means (2, 12) for detecting a photographing distance;

attitude detection means (13) for detecting an attitude of the camera; and exposure calculation means (23) for calculating an exposure value based on the output of said split photo-metering means, the output of said color temperature measurement means, the output of said photographing distance detection means and the output of said attitude detection means.

In another embodiment of the present invention, the sky photo-metering outputs detected by said split photo-metering means and said attitude detection means primarily contribute to the exposure value (S124, S126, S127) when the photographing distance is long (S121) and the color temperature is low (S122).

In another embodiment of the present invention, the contribution to the exposure value is done to increase the exposure value.

In another embodiment of the present invention, the contribution to the exposure value is done in such a manner that a high output of the output of said split photo-metering means is primarily used for 10 the calculation of the exposure value.

In accordance with the present invention, the color temperature of the light source which illuminates the object field is measured and the exposure value is determined while taking the color temperature information into consideration. Accordingly, a photograph which fits to an image of a time band in photographing an evening scene or morning scene is automatically produced.

DETAILED DESCRIPTION OF THE PREFERRED EMBODIMENTS

The present invention is now explained in detail in conjunction with embodiments with reference to the drawings.

Figure 1:
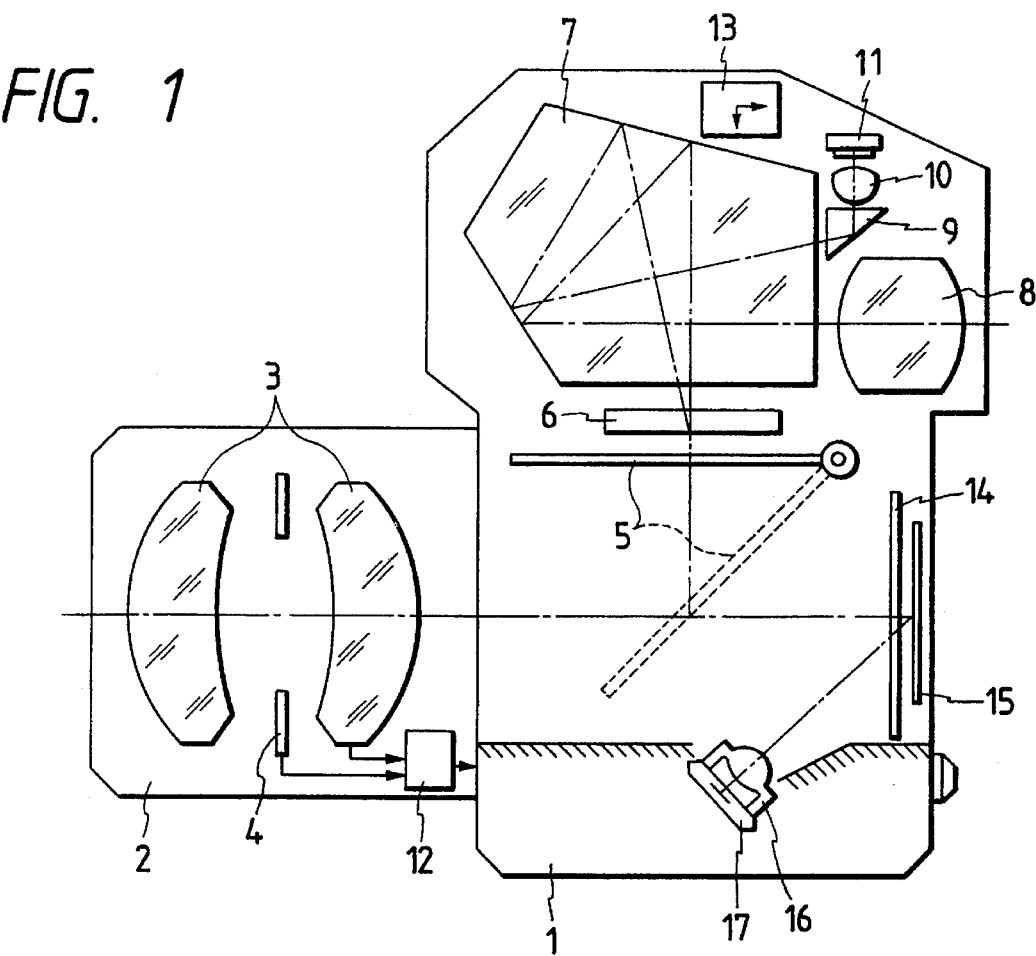
FIG. 1 shows a sectional view of a camera having an auto-exposure device of the present invention.

FIG. 1 shows a sectional view of a camera having an auto-exposure device in accordance with an embodiment of the present invention.

In a finder view mode, a light beam from a view field passes through a photographing lens 3 and a diaphragm 4 in a photographing lens barrel 2, is reflected by a main mirror 5 (in a broken line position) of a camera body 1, passes through a screen 6, a penta prism 7 and an eye lens 8 and reaches to an eye of a photographer.

A portion of the light beam passes from the penta prism 7 through a prism 9 and a condensing lens 10 and reaches a photo-metering element 11.

Figure 2:
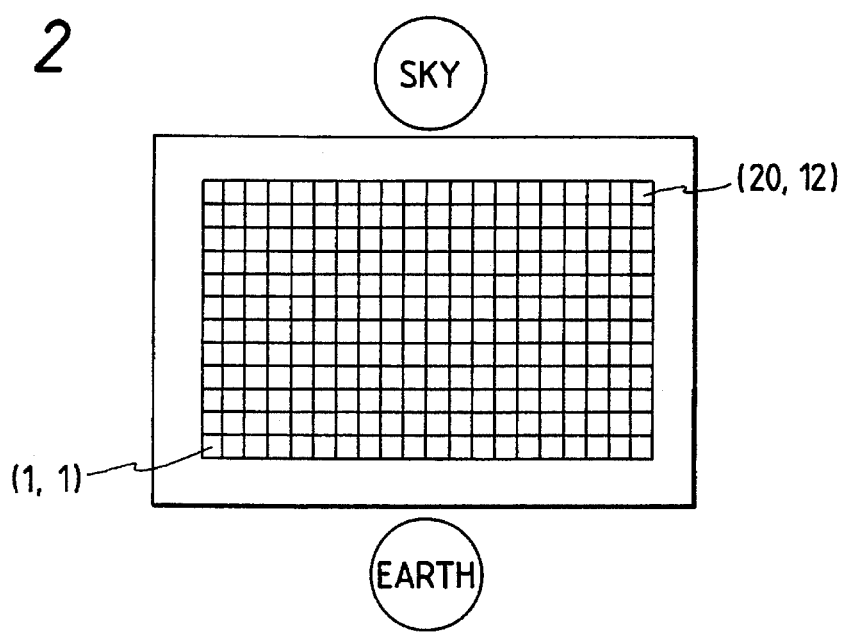
FIG. 2 shows a split pattern when a brightness of a screen is measured in the present invention.
Figure 3:
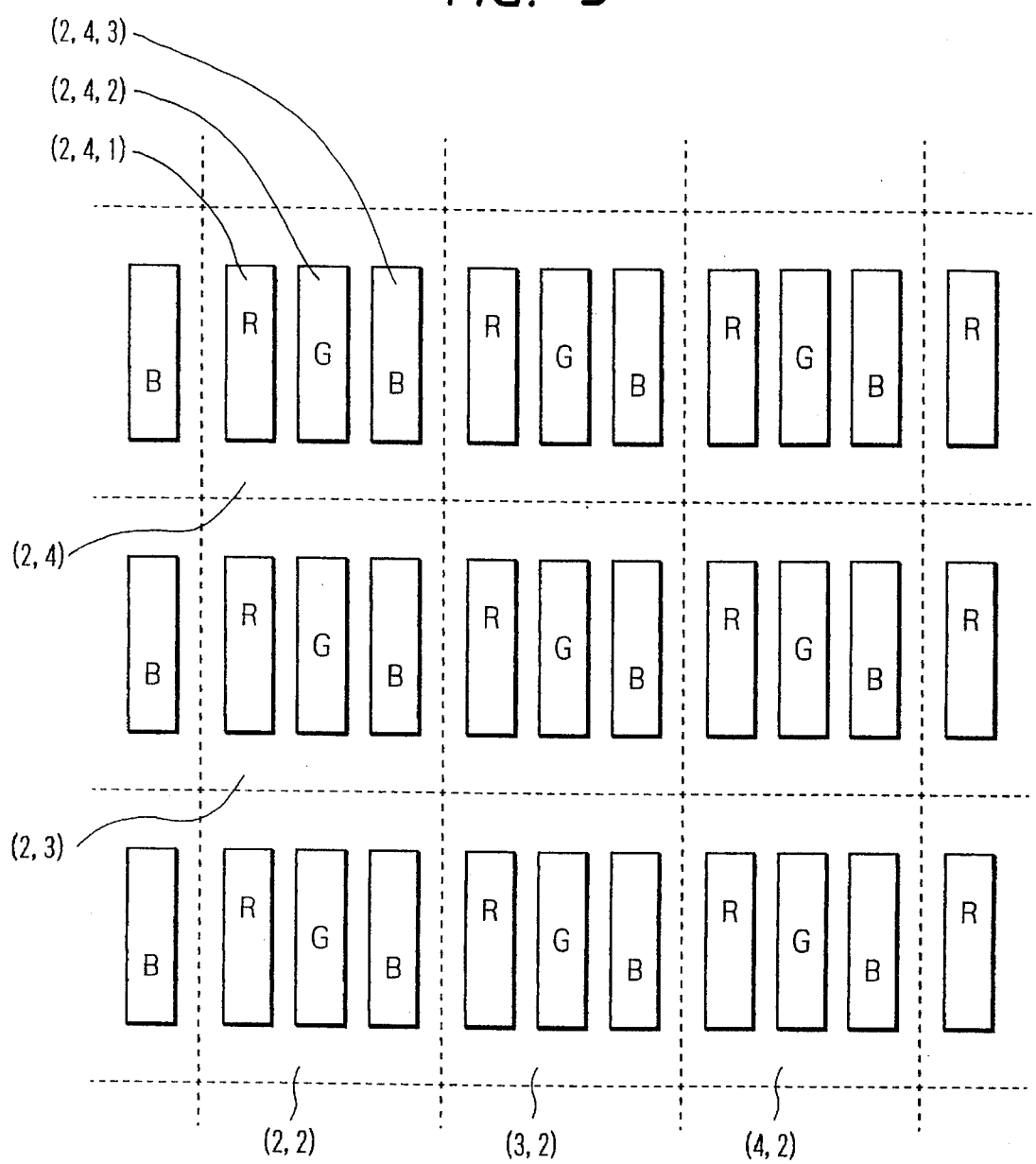
FIG. 3 shows a shape of a photo-sensor of a photo-metering element 11 of the present invention.

The photo-metering element 11 is a color two-dimensional CCD used in a video camera. As shown in FIG. 2, the view field is divided into horizontal 20× vertical 12=240 areas to meter the brightness, and as shown in FIG. 3, three colors R, G and B in the respective areas are metered.

A ROM 12 in the lens communicates photographing distance information X derived from the position of the photographing lens 3 and lens data such as stop value information of the diaphragm 4 to the camera body 1.

An attitude detection unit 13 detects an attitude of the camera body 1 and may comprise three mercury switches.

A photo-metering element 17 is used for photo-metering when a flash device not shown is used. A light beam emitted from the flash device is reflected by an object, passes through the photographing lens 3, the diaphragm 4 and a shutter 14, is reflected by a surface of a film 15, passes through a flash photo-metering condenser lens 16, and reaches the flash photo-metering element 17.

FIG. 2 shows a split pattern when the brightness of the view field in the screen is metered.

The photo-metering element 11 split-meters the brightness of the object image of the screen 6 through the condenser lens 10 as shown in FIG. 2. The split pattern includes horizontal 20× vertical 12=240 split areas. Addresses of the areas are numbered while the camera body 1 is held in a horizontal attitude, and a ground left area is (1, 1) and a sky right area is (20, 12).

FIG. 3 shows a shape of a photo-sensor of the photo-metering element 11.

Each of the 240 split areas shown in FIG. 2 comprises three photo-sensors arranged beneath three filters (not shown) for metering three colors R, G and B.

For example, the area (2, 4) comprises a photo-sensor addressed at (2, 4, 1) arranged below the R filter, a photo-sensor addressed at (2, 4, 2) arranged below the G filter and a photo-sensor addressed at (2, 4, 3) arranged below the B filter.

The three-color filters may be complementary color filters (M, C, Y) instead of R, G, B.

Figure 4:
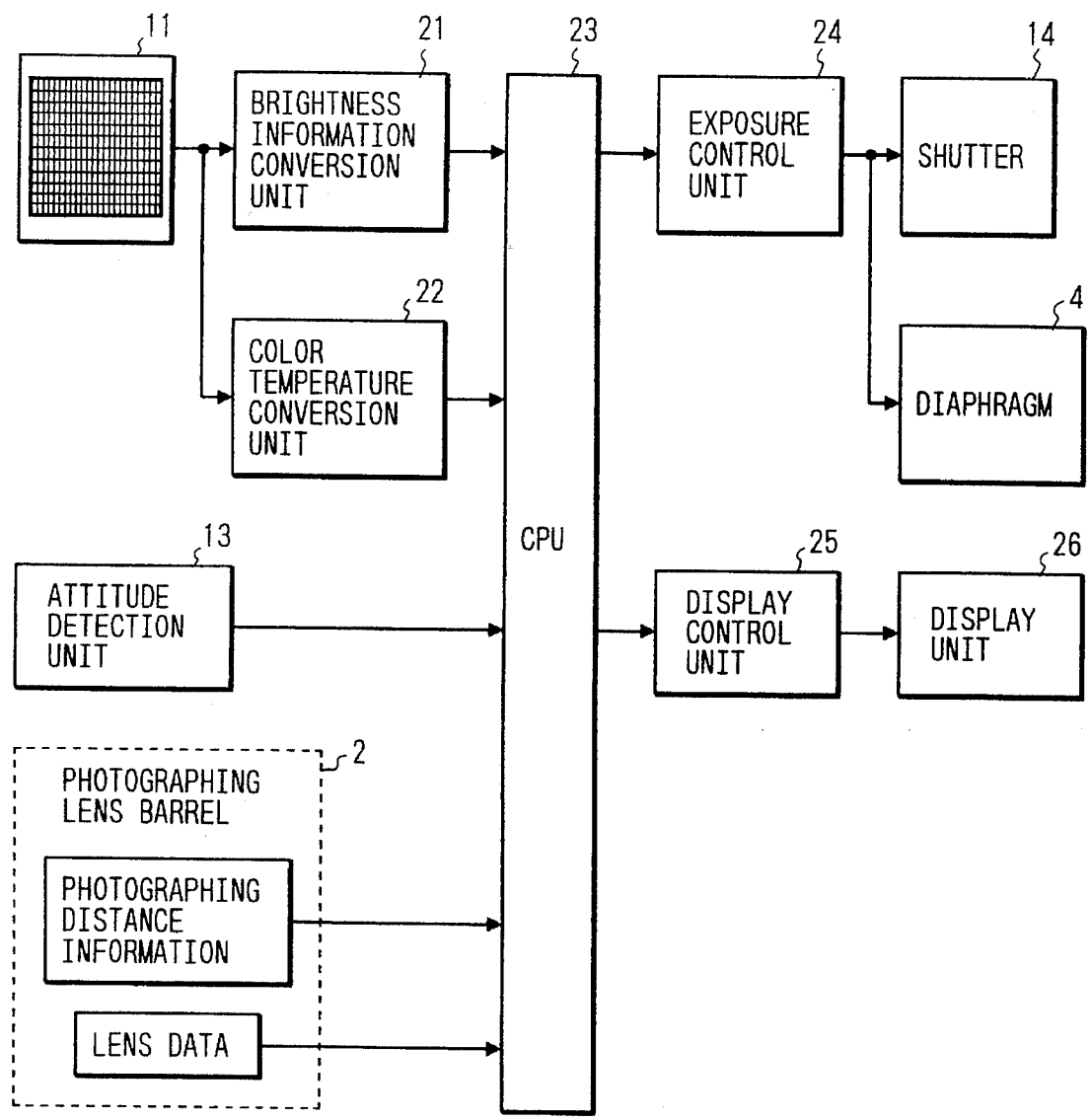
FIG. 4 shows a block diagram of an embodiment of the auto-exposure device of the present invention.

FIG. 4 shows a block diagram of an embodiment of the auto-exposure device of the present invention.

An output LV (m, n, c) of the photo-metering element 11 is, on one hand, converted to a brightness value VB (m, n) by a known brightness information conversion unit 21 and it is applied to a CPU 23, and on the other hand, converted to a color temperature CT by a known color temperature information conversion unit 22 and it is applied to the CPU 23. The detail of the color temperature information conversion unit 22 will be explained later with reference to FIGS. 10 to 12.

The attitude detection device 13 detects the attitude of the camera body 1 and supplies the detection result to the CPU 23. The result of the attitude detection is classified into three types of attitudes, a horizontal attitude, a vertical attitude with the penta penta prism 7 on the right side, and a vertical attitude with the penta prism 7 on the left side.

The photographing distance information X derived from the position of the photographing lens 3 stored in the ROM 12 in the lens, and the lens data such as the stop value information of the diaphragm 4 are supplied from the photographing lens barrel 2 to the CPU 23 in the camera body 1.

The CPU 23 calculates an optimum exposure value BVans based on the above input information and displays it on a display device 26 through a display control unit 25. Then, when a release switch, not shown, is depressed, an exposure control unit 24 drives the shutter 14 and the diaphragm 4 to control them into the calculated exposure value BVans.

Figure 5:
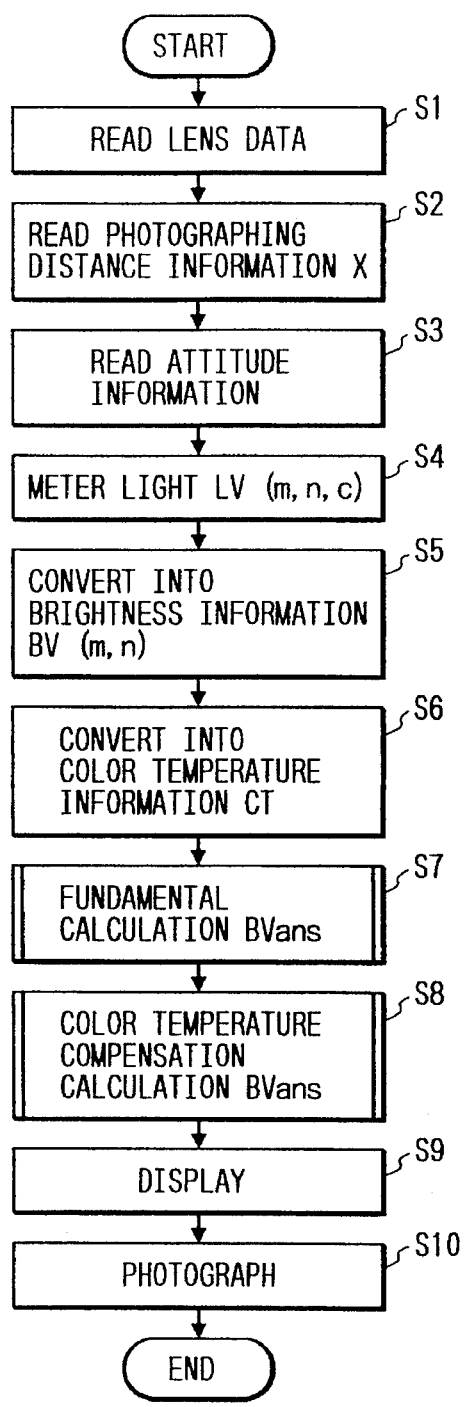
FIG. 5 shows a flow chart of a main algorithm of a CPU 23 of the present invention.

FIG. 5 shows a flow chart of a main algorithm of the CPU 23 of FIG. 4.

In a step S1, the lens information is read from the photographing lens barrel 2. Specifically, the lens information includes an open stop value Fo, an exit pupil distance PO and a focal distance f.

In a step S2, photographing distance information X is read from the photographing lens barrel 2.

In a step S3, an output signal from the attitude detection device 13 is received to detect the attitude of the camera body 1. The attitude detection result is classified to three classes, a horizontal attitude, a vertical attitude with the penta prism 7 on the right hand, and a vertical attitude with the penta prism 7 on the left hand.

In a step S4, photo-metering is made by the photo-metering element 11. The photo-metering output LV (m, n, c) includes horizontal 20×vertical 12×3 colors=720 data, and m=1–20, n=1–12 and c=1–3.

In a step S5, the three color data are combined for each area based on LV (m, n, c) and converted to a brightness value BV (m, n).

In a step S6, LV (m, n, c) is converted to a color temperature CT.

In a step S7, a fundamental operation is made for an exposure value based on the brightness value BV (m, n) derived in the step S5 to calculate an exposure value BVans. Detail thereof will be explained in conjunction with FIG. 6.

In a step S8, an exposure value with the color temperature being taken into consideration is calculated based on the brightness value BV (m, n) derived in the step S5 and the color temperature CT derived in the step S6 to calculate the exposure value BVans. Detail thereof will be explained in conjunction with FIGS. 7–9. In the calculation, the photographing distance X derived in the step S2 and the attitude information derived in the step S3 may also be used as required.

In a step S9, the exposure value Vans derived in the step S7 or S8 is displayed.

In a step S10, the photographing is made in accordance with the exposure value BVans derived in the step S7 or S8.

Figure 6:
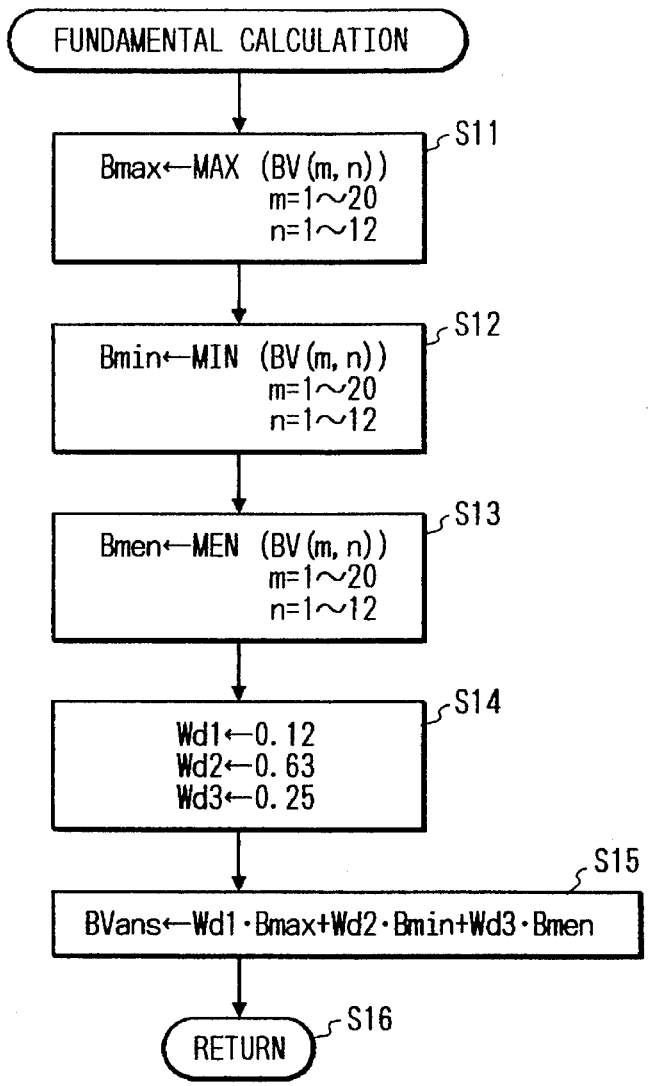
FIG. 6 shows a flow chart of detail of a step S7 of the present invention.

FIG. 6 shows a flow chart of the detail of the step S7 of FIG. 5.

In a step S11, a maximum brightness value Bmax of the 240 brightness values is determined. In a step S12, a minimum brightness value Bmin of the 240 brightness values is determined.

In a step S13, a mean brightness value Bmen of the 240 brightness values is determined.

In a step S14, weighting factors are set. For example, a weighting factor to Bmax is $W_{d1}=0.12$, a weighting factor to Bmin is $W_{d2}=0.63$, and a weighting factor to Bmen is $W_{d3}$ 0.25.

In a step S15, the exposure value is calculated by using the weighting factors set in the step S14 to get BVans:

$$BVans = W_{d1} \cdot Bmax + W_{d2} \cdot Bmin + W_{d3} \cdot Bmen \quad (1)$$

Figure 7:
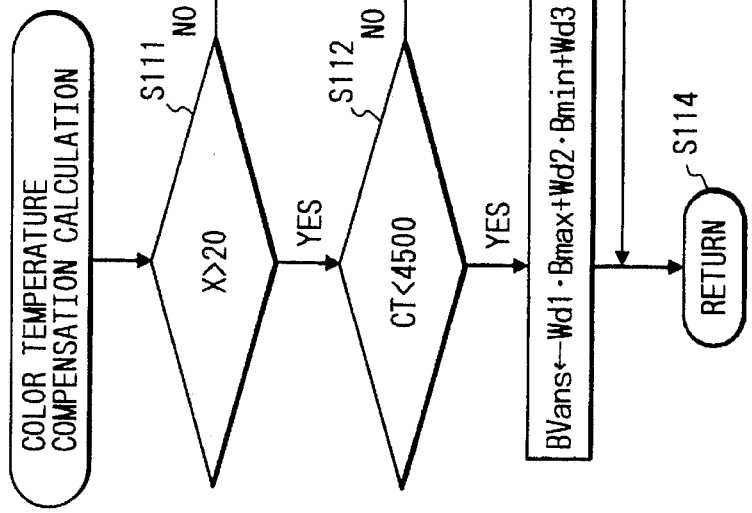
FIG. 7 shows a flow chart of detail of a first embodiment of a step S8 of the present invention.

FIG. 7 shows a flow chart of the detail of a first embodiment of the step S8 of FIG. 5.

In a step S101, whether the photographing distance X derived in the step S2 of FIG. 5 exceeds 20 meters or not is determined. If it exceeds, the process proceeds to a step S102, and if it does not exceed, the process proceeds to a step S105.

In the step S102, whether the color temperature CT derived in the step S6 of FIG. 5 is smaller than 4500K or not is determined. If it is smaller, the process proceeds to a step S103,, and if it is not smaller, the process proceeds to the step S105.

In the step S103, the weighting factors are set. For example, $W_{d1}=0.61$, $W_{d2}=0.10$ and $W_{d3}=0.29$.

In a step S104, the exposure value is calculated by using the weighting factors set in the step S103. The result BVans is get by:

$$BVans = W_{d1} \cdot Bmax + W_{d2} \cdot Bmin + W_{d3} Bmen \quad (2)$$

In the step S105, the process returns to the main routine of FIG. 5.

In the first embodiment, where the photographing distance X is long and the color temperature CT is low, the scene is assumed as an evening scene or morning scene, and the high brightness information (Bmax) is highly weighted ($W_{d1}=0.61$) in determining the exposure, that is, under-exposure is set so that the resulting photograph fits to an image of that time band.

Figure 8:
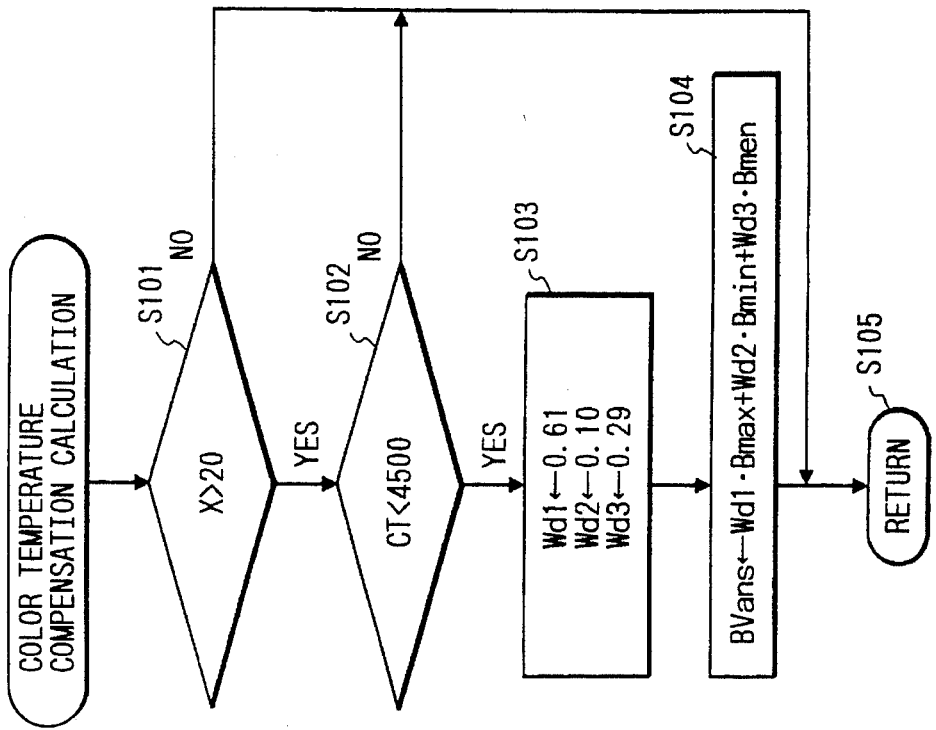
FIG. 8 shows a flow chart of detail of a second embodiment of the step S8 of the present invention.

FIG. 8 shows a flow chart of the detail of a second embodiment of the step S8 of FIG. 5.

In a step Sill, whether the photographing distance X derived in the step S2 of FIG. 5 exceeds 20 meters or not is determined. If it exceeds, the process proceeds to a step S112, and if it does not exceeds, the process proceeds to a step S114.

In the step S112, whether the color temperature CT derived in the step S6 of FIG. 5 is smaller than 4500K or not is determined. If it is smaller, the process proceeds to a step S113, and if it is not smaller, the process proceeds to the step S114.

In the step S113, a predetermined value is added to calculate the exposure value BVans:

$$BVans = W_{d1} \cdot Bmax + W_{d2} \cdot Bmin + W_{d3} Bmen + 2.3 \quad (3)$$

In the step S114, the process returns to the main routine of FIG. 5.

In the second embodiment, where the photographing distance X is long and the color temperature CT is low, the scene is assumed as an evening scene or morning scene and the exposure is calculated by adding the predetermined value (2, 3), that is, under-exposure is set so that the resulting photograph fits to an image of that time band.

Figure 9:
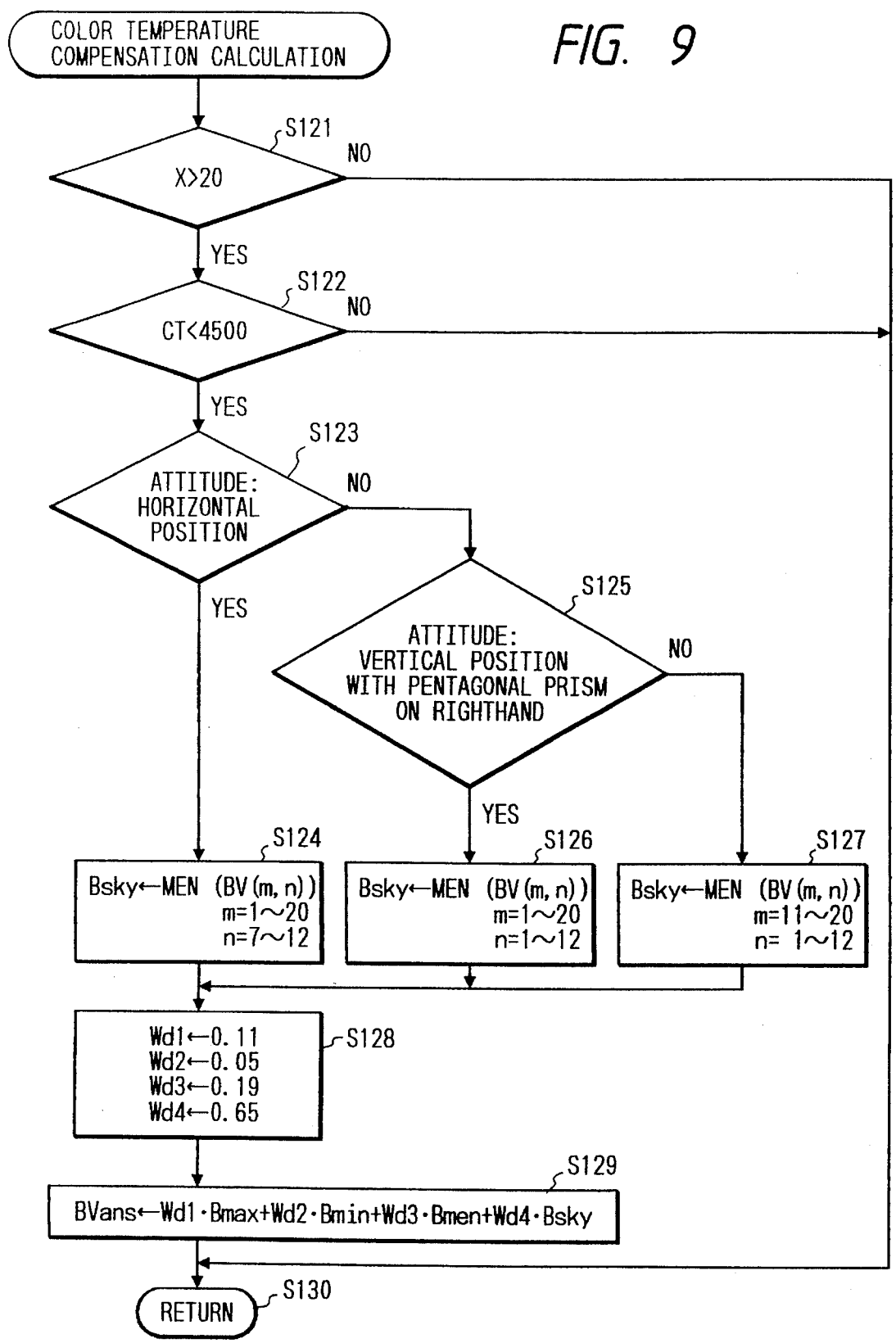
FIG. 9 shows a flow chart of detail of a third embodiment of the step S8 of the present invention.

FIG. 9 shows a flow chart of the detail of a third embodiment of the step S8 of FIG. 5.

In a step S121, whether the photographing distance X derived in the step S2 of FIG. 5 exceeds 20 meters or not is determined. If it exceeds, the process proceeds to a step S122, and if it does not exceeds, the process proceeds to a step S130.

In the step S122, whether the color temperature CT drived in the step S6 of FIG. 5 is smaller than 4500K or not is determined. If it is smaller, the process proceeds to a step S123, and if it is not smaller, the process proceeds to the step S130.

In the step S123, if the attitude of the camera body 1 derived in the step S3 of FIG. 5 is a horizontal attitude, the process proceeds to a step S124, and if it is not, the process proceeds to a step S125.

In the step S124, a mean brightness value Bsky of sky brightness values (m=1–20, n=7–12) in the horizontal attitude is determined, and the process proceeds to a step S128.

In the step S125, if the attitude of the camera body 1 derived in the step S3 of FIG. 5 is a vertical attitude with the penta prism 7 on the right hand, the process proceeds to a step S126, and if it is not, the process proceeds to a step S127.

In the step S126, a mean brightness value Bsky of sky brightness values (m=1–10, n=1–12) in the vertical attitude with the penta prism 7 on the right side is determined, and the process proceeds to the step S128.

In the step S127, it is assumed that the attitude of the camera body 1 is a vertical attitude with the penta prism 7 on the left hand, and a mean brightness value Bsky of sky brightness values (m=11–20, n=1–12) is determined, and the process proceeds to the step S128.

In the step S128, weighting factors are set. For example, $W_{d1}=0.11$, $W_{d2}=0.05$, $W_{d3}=0.19$ and a weighting factor for Bsky is $W_{d4}=0.65$.

In a step S129, an exposure value BVans is calculated by using the weighting factors set in the step S128:

$$BVans = W_{d1} \cdot Bmax + W_{d2} Bmin + W_{d3} Bmen + W_{d4} \cdot Bsky \quad (4)$$

In a step S130, the process returns to the main routine of FIG. 5.

In the third embodiment, when the photographing distance X is long and the color temperature CT is low, the scene is assumed as an evening scene or morning scene and the exposure is calculated with a high weighting factor ($W_{d4}=0.65$) to the sky brightness information (Bsky), that is, under-exposure is set so that the resulting photograph fits to an image of that time band.

A principle of the color temperature information conversion unit 22 of FIG. 4 is now explained with reference to FIGS. 10–12.

Figure 10:
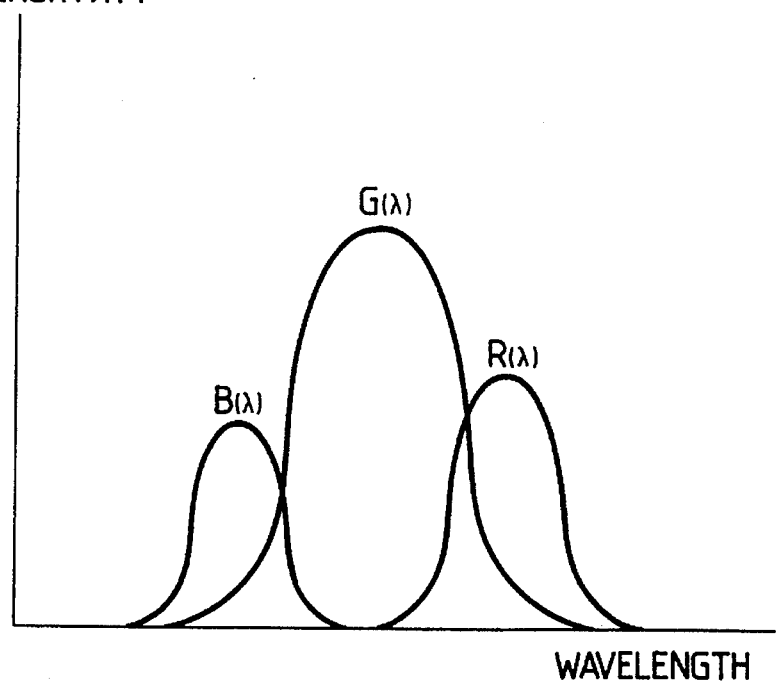
FIG. 10 shows a three-color spectrometer sensitivity characteristic.

FIG. 10 shows a diagram of a spectrosensitivity characteristic of three colors (R, G, B) shown in FIG. 3. An abscissa represent a wavelength and an ordinate represents a sensitivity. A red sensitivity is represented by $R(\lambda)$, a green sensitivity is represented by $G(\lambda)$ and a blue sensitivity is represented by $B(\lambda)$.

Assuming that outputs from the photo-sensors having the sensitivities $R(\lambda)$, $G(\lambda)$ and $B(\lambda)$ are X, Y and Z, respectively, chromaticity coordinates xy are determined by:

$$x=X/(X+Y+Z) \quad (5)$$

$$y=Y/(X+Y+Z) \quad (6)$$

Figure 11:
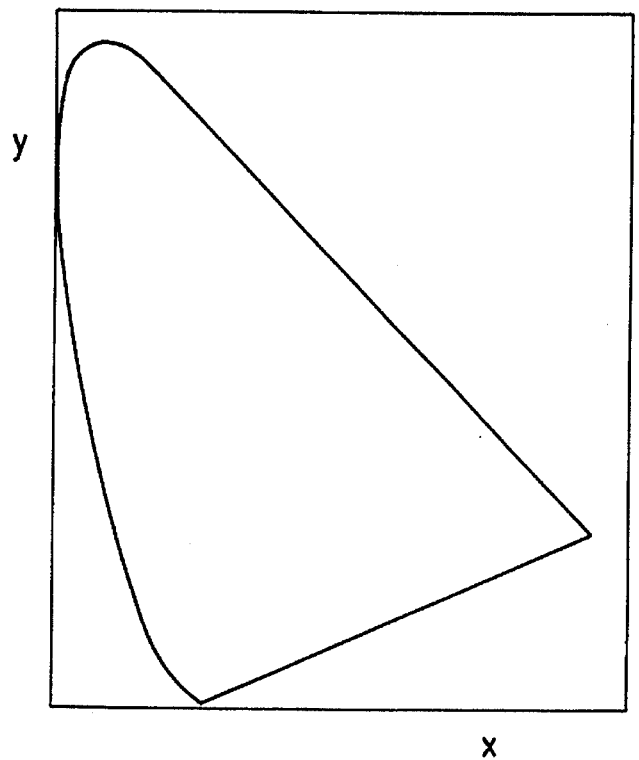
FIG. 11 shows an xy chromaticity chart.

FIG. 11 shows an xy chromaticity diagram. All colors are located inside of or on a horse-shoe shape, and a color of an area is determined from the x and y values determined from the above formulas (5) and (6).

Figure 12:
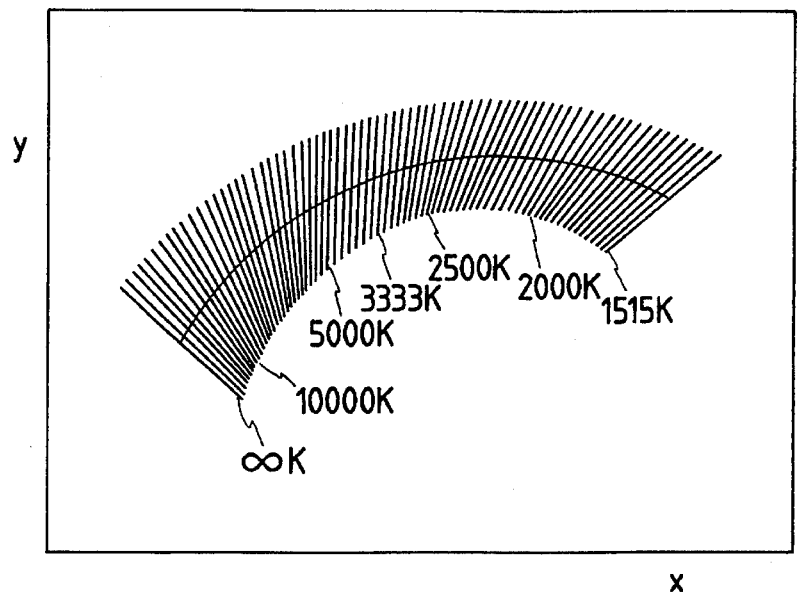
FIG. 12 shows a lotus of a complete radiation material and an equi-color temperature curve.

FIG. 12 shows a lotus of complete radiation material and an equi-color temperature curve. The color temperature is determined by determining an equi-color temperature curve which it belongs to, based on the x and y values determined from the formulas (5) and (6).

In the present invention, 240 color temperatures for the 240 areas are determined, and the color temperature information conversion unit 22 calculates a mean value thereof to determine an overall color temperature.

Figure 13:
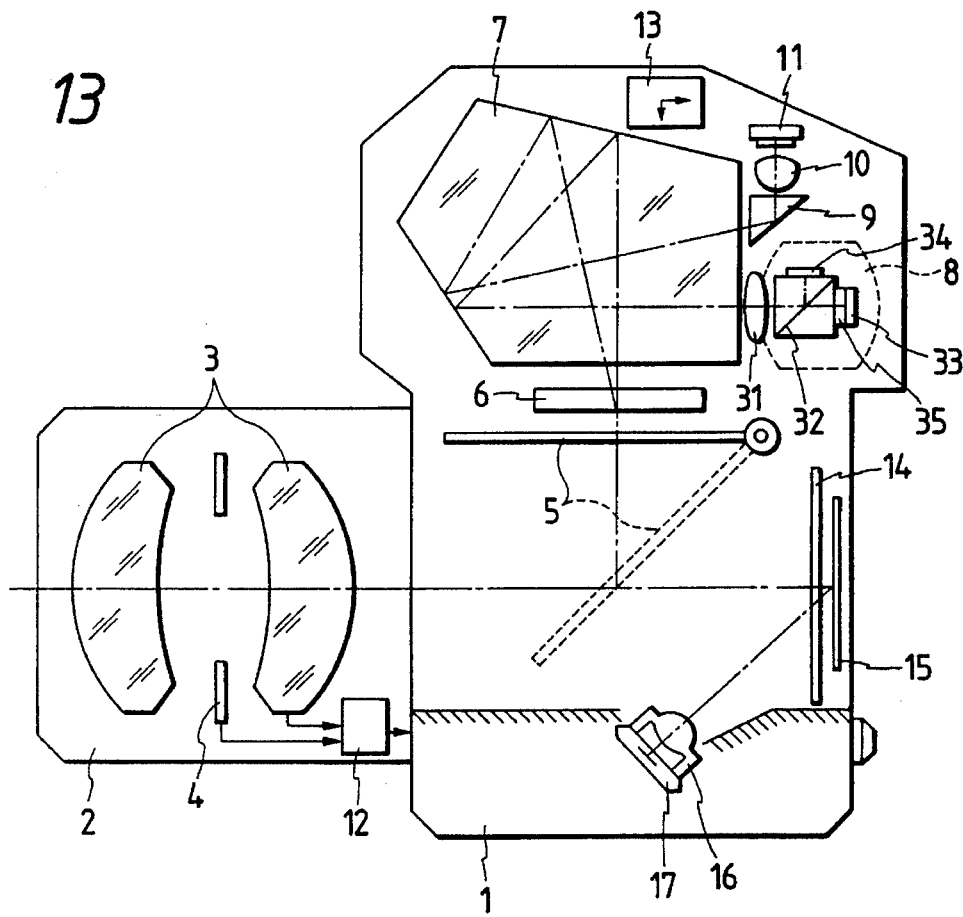
FIG. 13 shows an embodiment in which a measurement system for a color temperature of the auto-exposure device of the present invention is provided separately from a measurement system for an exposure operation.
Figure 14:
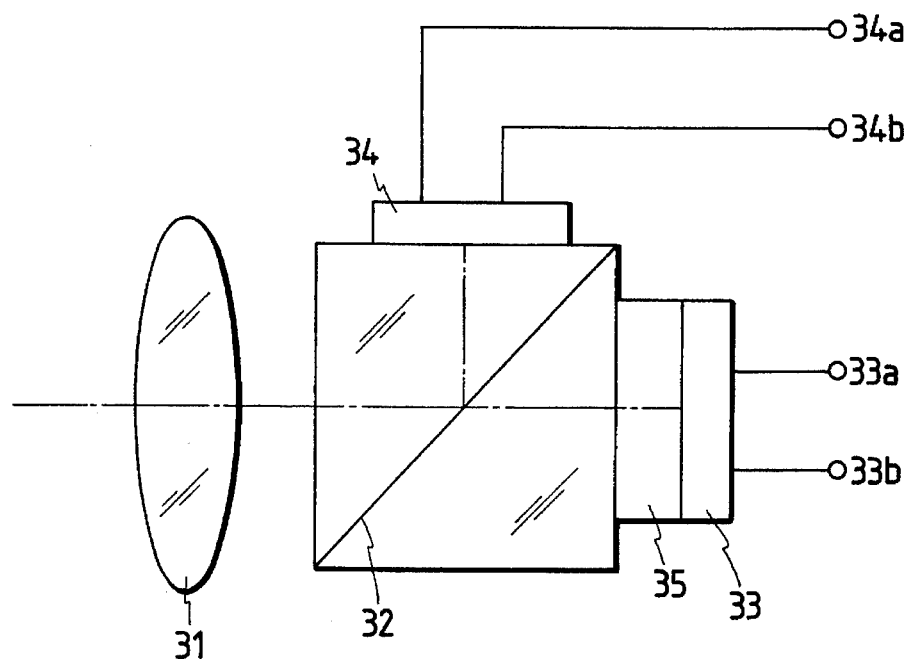
FIG. 14 shows detail of the measurement system for the color temperature in the embodiment of FIG. 13.
Figure 15:
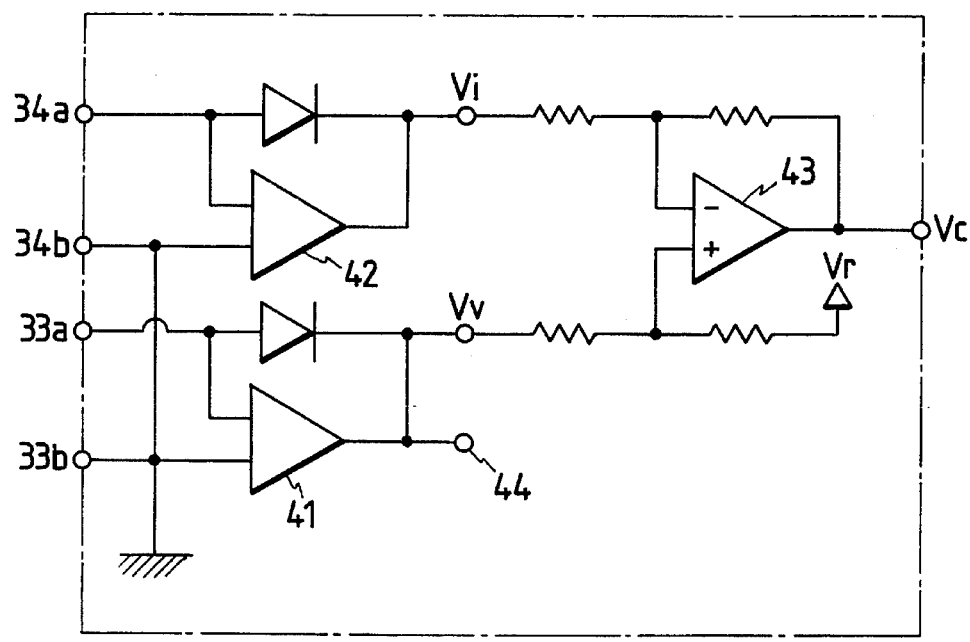
FIG. 15 shows a circuit configuration of color temperature calculation in the embodiment of FIG. 13.

FIGS. 13–15 show a second embodiment for calculating the color temperature, and detail thereof is disclosed in Japanese Laid-Open Patent Application No. 58-86504 filed by the assignee of the present invention.

In the embodiment of FIG. 1, the color temperature is metered by the exposure calculation photo-metering element 11. In the embodiment of Fig. 13, a color temperature photo-metering system ( 31–35 ) is provided separately from the exposure calculation photo-metering element.

Detail of the color temperature photo-metering system (31–35) will be explained later in conjunction with FIG. 14. Other portions are common to those of FIG. 1 and the explanation thereof is omitted.

FIG. 14 shows the detail of the color temperature photo-metering system ( 31–35 ).

A wave selection mirror 32 having a visual light transmission characteristic and an infra-red ray reflection characteristic is provided behind a condenser lens 31, a light which primarily includes a visual light is sensed by a photo-sensor 33, and a light which primarily includes an infra-red ray 10 is sensed by a photo-sensor 34. A filter 35 which transmits only the visual light is also provided in the photo-metering system to meter the exposure.

FIG. 15 shows a circuit configuration of color temperature calculation.

Terminals 33a, 33b, 34a and 34b of FIG. 14 are connected to the circuit of FIG. 15. A photo-current generated in the photo-sensor 33 by the light which primarily includes the visual light is logarithmically converted by an operational amplifier 41 to a voltage $V_v$.

A photo-current generated in the photo-sensor 34 by the light which primarily includes the infrared ray is logarithmically converted by an operational amplifier 42 to a voltage $V_i$. A differential amplifier 43 having an appropriate offset voltage $V_r$ produces a color temperature quantity $V_c$ as follows:

$$V_c=(V_v-V_i)+V_r \quad (7)$$

In accordance with the present invention, the color temperature of the light source which illuminates the object field is metered and the auto-exposure device of the camera calculates the exposure value while taking the color temperature information into consideration. Accordingly, a photograph which fits to the image of the time band of photographing in the photographing of 10 evening scene or morning scene is automatically produced.

What is claimed is:

1. A camera having an auto-exposure device, said auto-exposure device comprising:
   a divided brightness measuring circuit to divide an object field into a plurality of areas and to measure brightnesses of said areas, respectively;
   a color temperature measuring circuit to measure color temperatures of said areas, respectively; and
   an exposure calculation circuit to calculate an exposure value based on the brightnesses and color temperatures of said areas.

2. A camera according to claim 1, wherein said auto-exposure device further comprises an attitude detecting device to detect an attitude of said camera, and wherein said exposure calculation circuit calculates an exposure value based on an output of said attitude detecting device and the brightnesses and color temperatures of said areas.

3. A camera according to claim 1, wherein said auto-exposure device further comprises an attitude detecting device to detect an attitude of said camera, and wherein said exposure calculation circuit calculates the exposure value while giving a weight to an output of said divided brightness measuring circuit associated with an upper area in the object field in a finder, which upper area is derived from an output of said attitude detecting device, when an output of said color temperature measuring circuit is smaller than a predetermined value.

4. A camera according to claim 1, wherein said exposure calculation circuit calculates an exposure value based on an output of said divided brightness measuring circuit and corrects the calculated exposure value based on an output of said color temperature measuring circuit.

5. A camera according to claim 1, wherein said exposure calculation circuit calculates an exposure value based on an output of said divided brightness measuring circuit and an output of said color temperature measuring circuit when the output of said color temperature measuring circuit is smaller than a predetermined value.

6. A camera according to claim 1, wherein said exposure calculation circuit corrects an exposure value calculated based on an output of said divided brightness measuring circuit to a larger exposure value based on an output of said color temperature measuring circuit.

7. A camera according to claim 1, wherein said exposure calculation circuit calculates an exposure value while giving a weight to a high output value among outputs of said divided brightness measuring circuit.

8. A camera having an auto-exposure device, said auto-exposure device comprising:
   a divided brightness measuring circuit to divide an object field into a plurality of areas and measuring brightnesses of said areas, respectively;

a color temperature measuring circuit to measure color temperatures of said areas, respectively;

an object distance detecting circuit to detect an object distance; and an exposure calculation circuit to calculate an exposure value based on the brightnesses and color temperatures of said areas and an output of said object distance detecting circuit.

9. A camera according to claim 8, wherein said auto-exposure device further comprises an attitude detecting device to detect an attitude of said camera, and wherein said exposure calculation circuit calculates an exposure value based on an output of said attitude detecting device, the output of said object distance detecting circuit and the brightnesses and color temperatures of said areas.

10. A camera according to claim 8, wherein said auto-exposure device further comprises an attitude detecting device to detect an attitude of said camera, and wherein said exposure calculation circuit calculates an exposure value while giving a weight to an output of said divided brightness measuring circuit associated with an upper area in the object field in a finder, which upper area is derived from an output of said attitude detecting device, when the output of said object distance detecting circuit is larger than a first predetermined value and an output of said color temperature measuring circuit is smaller than a second predetermined value.

11. A camera according to claim 8, wherein said exposure calculation circuit calculates an exposure value based on an output of said divided brightness measuring circuit, the output of said object distance detecting circuit and an output of said color temperature measuring circuit when the output of said object distance detecting circuit is larger than a first predetermined value and the output of said color temperature measuring circuit is smaller than a second predetermined value.

12. A camera having an auto-exposure device, said auto-exposure device comprising:

a photometric sensor to divide an object field into a plurality of areas and to measure brightnesses of said areas, respectively;

a filter disposed at an object field side of said photometric sensor;

a color temperature measuring circuit to measure color temperatures of said areas, respectively, based on light transmitted through said filter; and an exposure calculation circuit to calculate an exposure value based on the brightnesses and color temperatures of said areas.

13. A camera according to claim 12, wherein said filter includes a red filter, a green filter and a blue filter.

14. A camera according to claim 12, wherein said filter includes a magenta filter, a cyan filter and a yellow filter.

15. A camera according to claim 12, wherein said auto-exposure device further comprises an attitude detecting device to detect an attitude of said camera, and wherein said exposure calculation circuit calculates an exposure value based on an output of said attitude detecting device and the brightnesses and color temperatures of said areas.

16. A camera according to claim 12, wherein said auto-exposure device further comprises an attitude detecting device to detect an attitude of said camera, and wherein said exposure calculation circuit calculates an exposure value while giving a weight to an output of said photometric sensor associated with an upper area in the object field in a finder, which upper area is derived from an output of said attitude detecting device, when an output of said color temperature measuring circuit is smaller than a predetermined value.

17. A camera having an auto-exposure device, said auto-exposure device comprising:

a photometric sensor to divide an object field into a plurality of areas and to measure brightnesses of said areas, respectively;

a filter disposed at an object field side of said photometric sensor;

a color temperature measuring circuit to measure color temperatures of said areas, respectively, based on light transmitted through said filter;

an object distance detecting circuit to detect an object distance; and an exposure calculation circuit to calculate an exposure value based on and output of said object distance detecting circuit and the brightnesses and color temperatures of said areas.

18. A camera according to claim 17, wherein said filter includes a red filter, a green filter and a blue filter.

19. A camera according to claim 17, wherein said filter includes a magenta filter, a cyan filter and a yellow filter.

20. A camera according to claim 17, wherein said auto-exposure device further comprises an attitude detecting device to detect an attitude of said camera, and wherein said exposure calculation circuit calculates an exposure value based on an output of said attitude detecting device, the output of said object distance detecting circuit and the brightnesses and color temperatures of said respective areas.

21. A camera according to claim 17, wherein said auto-exposure device further comprises an attitude detecting device to detect an attitude of said camera, and wherein said exposure calculation circuit calculates an exposure value while giving a weight to an output of said photometric sensor associated with an upper area in the object field in a finder, which upper area is derived from an output of said attitude detecting device, when the output of said object distance detecting circuit is larger than a first predetermined value and an output of said color temperature measuring circuit is smaller than a second predetermined value.

22. A method of calculating an exposure value in an auto-exposure device of a camera, comprising the steps of:

dividing an object field into a plurality of areas and measuring brightnesses of said areas, respectively;

measuring color temperatures of said areas, respectively; and calculating an exposure value based on the brightness and color temperatures of said areas.

23. A method of calculating an exposure value in an auto-exposure device of a camera, comprising the steps of:

dividing an object field into a plurality of areas and measuring brightnesses of said areas, respectively;

measuring color temperatures of said areas, respectively;

detecting an object distance; and calculating an exposure value based on the brightnesses and color temperatures of said areas and the object distance.

24. A method of calculating an exposure value in an auto-exposure device of a camera, comprising the steps of:

dividing an object field into a plurality of areas and measuring brightnesses of said areas, respectively, by a photometric sensor;

measuring color temperatures of said areas, respectively, based on light transmitted through a filter disposed at an object field side of said photometric sensor; and calculating an exposure value based on the brightnesses and color temperatures of said areas.

25. A method of calculating an exposure value in an auto-exposure device of a camera, comprising the steps of:

dividing an object field into a plurality of areas and measuring brightnesses of said areas, respectively, by a photometric sensor;

measuring color temperatures of said areas, respectively, based on light transmitted through a filter disposed at an object field side of said photometric sensor;

detecting an object distance; and calculating an exposure value based on the brightnesses and color temperatures of said areas and the object distance.

* * * * *

UNITED STATES PATENT AND TRADEMARK OFFICE
CERTIFICATE OF CORRECTION

PATENT NO. : 5,596,387
DATED : January 21, 1997
INVENTOR(S) : Tadao TAKAGI

It is certified that error appears in the above-indentified patent and that said Letters Patent is hereby corrected as shown below:

Column 10, (claim 22) line 48, "brightness" should be --brightnesses--.

Signed and Sealed this

Twenty-seventh Day of May, 1997

Attest:

BRUCE LEHMAN

Attesting Officer

Commissioner of Patents and Trademarks